United States Patent
Liu et al.

(10) Patent No.: US 11,902,171 B2
(45) Date of Patent: Feb. 13, 2024

(54) COMMUNICATION SYSTEM BETWEEN DIES AND OPERATION METHOD THEREOF

(71) Applicants: Global Unichip Corporation, Hsinchu (TW); Taiwan Semiconductor Manufacturing Company, Ltd., Hsinchu (TW)

(72) Inventors: Chang-Ming Liu, Hsinchu (TW); Yung-Sheng Fang, Hsinchu (TW); Pei Yu, Hsinchu (TW); Igor Elkanovich, Hsinchu (TW); Chia-Chien Tu, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 269 days.

(21) Appl. No.: 17/389,367

(22) Filed: Jul. 30, 2021

(65) Prior Publication Data

US 2023/0032605 A1 Feb. 2, 2023

(51) Int. Cl.
*H04L 47/32* (2022.01)
*H04L 43/0823* (2022.01)
*H04L 47/62* (2022.01)

(52) U.S. Cl.
CPC .......... *H04L 47/32* (2013.01); *H04L 43/0847* (2013.01); *H04L 47/62* (2013.01)

(58) Field of Classification Search
CPC ...... H04L 47/32; H04L 43/0847; H04L 47/62
See application file for complete search history.

(56) References Cited

U.S. PATENT DOCUMENTS

| | | | |
|---|---|---|---|
| 11,063,596 B1 | 7/2021 | Wang et al. | |
| 2008/0137689 A1* | 6/2008 | Shiizaki | H04L 1/1887 370/498 |
| 2020/0220667 A1 | 7/2020 | Lundgren et al. | |

FOREIGN PATENT DOCUMENTS

| | | |
|---|---|---|
| CN | 111955027 | 11/2020 |
| TW | 201135746 | 10/2011 |

OTHER PUBLICATIONS

"Office Action of Taiwan Counterpart Application", dated Jan. 19, 2023, p. 1-p. 7.

(Continued)

*Primary Examiner* — Siming Liu
(74) *Attorney, Agent, or Firm* — JCIPRNET (57) ABSTRACT

A communication system and an operation method thereof are provided. The transmitting device transmits the current data unit and the transmitted data verification information to the receiving device through the communication interface, and records the current data unit in an FIFO buffer. The receiving device counts the received data identification value by itself based on the current data unit received from the communication interface. The receiving device uses the received data identification value and the transmitted data verification information to check whether the current data unit received from the communication interface has errors. When the current data unit is in error, the receiving device returns an error flag to the transmitting device so that the transmitting device suspends the transmission of the new data unit, and transmits the buffered data unit recorded in the FIFO buffer to the receiving device through the communication interface.

19 Claims, 7 Drawing Sheets

(56) References Cited

OTHER PUBLICATIONS

Ting-Hao Wang et al., "Interface of Integrated Circuit Die and Method for Arranging Interface Thereof", Unpublished U.S. Appl. No. 17/134,534, filed Dec. 28, 2020.
Ting-Hao Wang et al., "Circuit for Providing Clock to De-Serializer in Communication Physical Layer", Unpublished U.S. Appl. No. 17/147,405, filed Jan. 12, 2021.
Igor Elkanovich et al., "Circuit of Communication Interface Between Two Dies and Method to Manage Communication Interface", Unpublished U.S. Appl. No. 17/185,895, filed Feb. 25, 2021.

* cited by examiner

COMMUNICATION SYSTEM BETWEEN DIES AND OPERATION METHOD THEREOF

BACKGROUND

Field of the Disclosure

The disclosure relates to a communication system, and particularly relates to a communication system between dies and an operation method thereof.

Description of Related Art

Digital electronic devices based on semiconductor integrated circuits, such as mobile phones, digital cameras, personal digital assistants (PDA), etc., are designed to have functions that are more powerful to adapt to various applications in the modern digital world. However, in the current trend of semiconductor manufacturing, digital electronic devices are designed to be smaller and lighter, as well as have improved functionality and higher performance. The semiconductor device can be packaged into a 2.5D semiconductor device, in which several dies can be integrated into a larger integrated circuit. Contact elements, interposer layers or redistribution layers (RDL) are used for connection between different dies. Packaging technologies such as integrated Fan-Out (InFO) and chip-on-wafer-on-substrate (CoWoS) can be utilized to package multiple chips assembled side by side.

Regarding the entire electronic circuit, one die may need to be electrically connected to one or more dies. There will be communication between different dies. The transmitting device (one of the dies) can transmit data to the receiving device (the other die) through the communication interface. In any case, due to noise interference or other factors, the data received by the receiving device from the communication interface may be in error. How to ensure the correctness of the data received by the receiving device is still one of many technical issues to be solved.

It should be noted that the content of the "BACKGROUND" section is used to facilitate understanding of the disclosure. Part of the content (or all of the content) disclosed in the "BACKGROUND" section may not be a conventional technology known to those with ordinary knowledge in the technical field. The content disclosed in the "BACKGROUND" section does not mean that the content has been known to those with ordinary knowledge in the technical field before filing of the disclosure.

SUMMARY OF THE DISCLOSURE

The disclosure provides a communication system and an operation method thereof to ensure the correctness of the data received by the receiving device.

In an embodiment of the disclosure, the communication system includes a transmitting device and a receiving device. The transmitting device is configured to calculate the transmitted data verification information of the current data unit in the multiple data units. The transmitting device transmits the current data unit and the transmitted data verification information to the communication interface. The transmitting device records the current data unit in an FIFO (first-in-first-out) buffer. The receiving device is configured to receive the current data unit and the transmitted data verification information from the communication interface. The receiving device counts the received data identification value by itself based on the current data unit received from the communication interface. The receiving device uses the received data identification value and the transmitted data verification information received from the communication interface to check whether the current data unit received from the communication interface is in error. When the current data unit received from the communication interface is in error, the receiving device returns an error flag to the transmitting device so that the transmitting device suspends the transmission of the new data unit based on the error flag, and transmits at least one buffered data unit recorded in the FIFO buffer to the receiving device through the communication interface.

In an embodiment of the disclosure, the operation method includes: calculating, by the transmitting device, the transmitted data verification information of the current data unit in the multiple data units; transmitting, by the transmitting device, the current data unit and the transmitted data verification information to the communication interface, and recording the current data unit in the FIFO buffer; receiving, by the receiving device, the current data unit and the transmitted data verification information from the communication interface; counting, by the receiving device, the received data identification value by itself based on the current data unit received from the communication interface; using, by the receiving device, the received data identification value and the transmitted data verification information received from the communication interface to check whether the current data unit received from the communication interface is in error; returning, by the receiving device, an error flag to the transmitting device when the current data unit received from the communication interface is in error; suspending, by the transmitting device, the transmission of the new data unit based on the error flag, and transmitting at least one buffered data unit recorded in the FIFO buffer to the receiving device through the communication interface.

Based on the above, the receiving device described in the embodiments of the disclosure counts the received data identification value by itself. Therefore, during normal transmission period, there is no need to transmit the identification value of the current data unit between the receiving device and the transmitting device. When the current data unit received by the receiving device is in error, the receiving device returns an error flag to the transmitting device to notify the transmitting device to transmit the buffered data unit recorded in the FIFO buffer to the receiving device again.

In order to make the features and advantages of the disclosure more comprehensible, the following specific embodiments are described in detail in conjunction with the accompanying drawings.

DESCRIPTION OF EMBODIMENTS

The term "coupling (or connection)" used throughout the specification (including claims) of the disclosure can refer to any direct or indirect connection means. For example, if it is described that that the first device is coupled (or connected) to the second device, it should be interpreted as that the first device can be directly connected to the second device, or the first device can be indirectly connected to the second device through other devices or some or other connection means. The terms "first" and "second" mentioned throughout the specification (including claims) of the disclosure are used to name the element, or to distinguish between different embodiments or ranges, but not to limit the upper or lower limit of the number of elements, or to limit the sequence of elements. In addition, wherever possible, elements/components/steps with the same reference numbers in the drawings and embodiments represent the same or similar parts. Elements/components/steps denoted by the same reference numerals or the same terms in different embodiments may serve as cross-reference for one another.

The disclosure relates to data transmission between two devices (for example, two dies). Several embodiments are provided below to describe the disclosure, but the disclosure is not limited to the embodiments.

The entire integrated circuit can be manufactured into a semiconductor device through a semiconductor manufacturing process, and the semiconductor device can be manufactured based on a stack structure of a 2.5D semiconductor device. The interface of the die (receiving device) for receiving data may include a frame decoding circuit associated with a de-serialized circuit. In an embodiment, the interface in the semiconductor structure is integrated in the entire integrated circuit.

Figure 1:
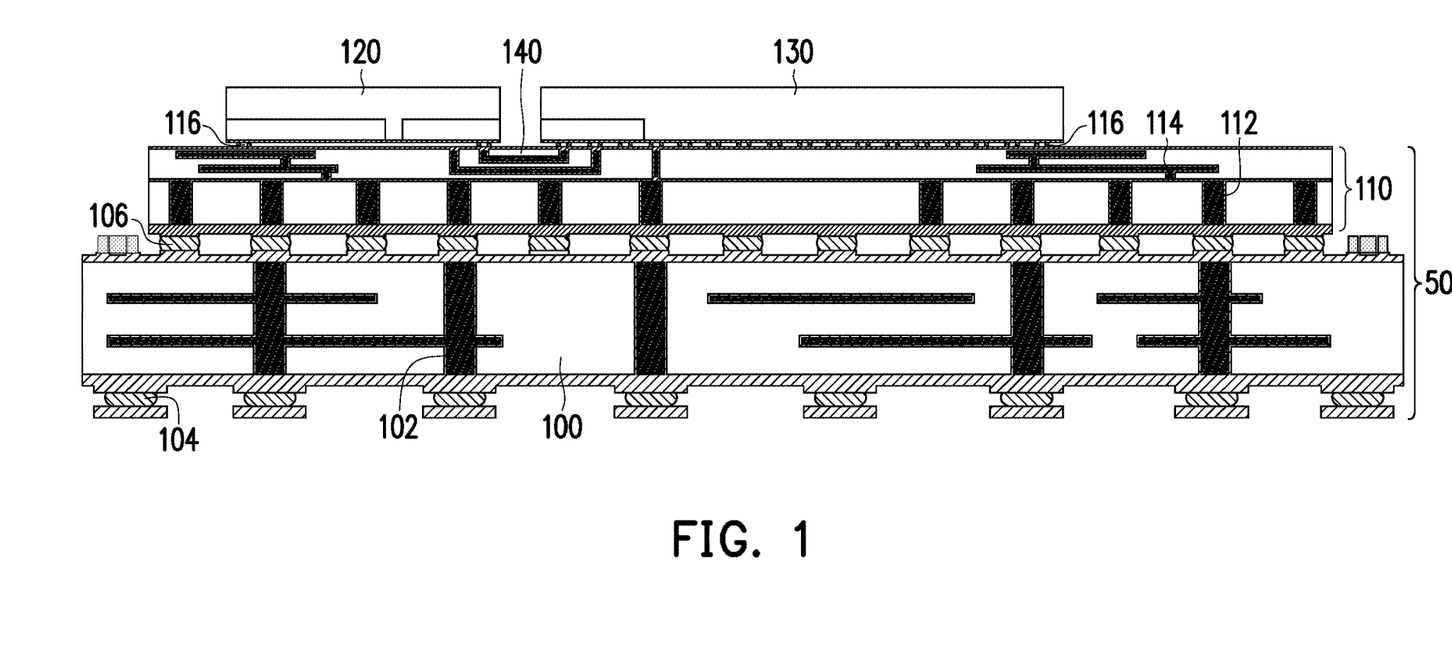
FIG. 1 is a schematic view of a cross-sectional stacked structure of a 2.5D semiconductor device with a communication interface according to an embodiment of the disclosure.

First, semiconductor manufacturing will be described. FIG. 1 is a schematic view of a cross-sectional stacked structure of a 2.5D semiconductor device with a communication interface according to an embodiment of the disclosure. Please refer to FIG. 1, based on 2.5D packaging technology, a chip-on-wafer-on-substrate (CoWoS) or integrated fan-out (InFO) platform 50 with an expected integrated circuit structure is formed. The CoWoS or InFO platform 50 may include a package substrate 100 with a solder ball 104 at the bottom and a contact element 106 at the top. A via 102 can be used to connect from the solder ball 104 at the bottom to the contact element 106 at the top. In addition, an interposer layer or a redistribution layer (RDL) 110 may be further formed on the substrate 100, and is connected to the contact element 106. The interposer layer or RDL layer 110 is embedded with a routing structure 140, and the routing structure 140 has a routing path for connection purposes. The interposer layer or RDL layer 110 may further include a through-silicon-Via (TSV) 112, an interconnect wiring 114, and a contact elements 116. Here, depending on the manufacturing process that is adopted, the contact element 116 may be a via or a contact element or any suitable connection structure for terminal-to-terminal contact. This embodiment provides no limitation to the type of the contact elements 106 and 116.

In practical applications, additional die can also be used, such as an application-specific integrated circuit (ASIC) die 130 and a serializer-deserializer (SerDes) die 120 for implementing the CoWoS or InFO platform 50. The ASIC die 130 and the SerDes die 120 are connected by a routing structure 140 (wiring 114 and contact element 116). One ASIC die 130 can be connected to multiple SerDes dies 120 for various peripheral communications.

Figure 2:
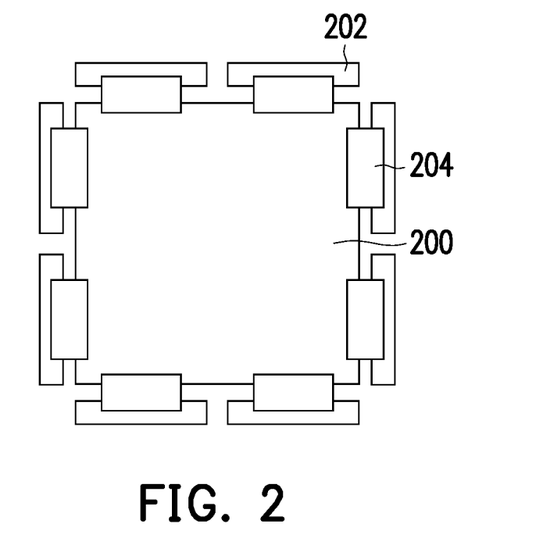
FIG. 2 is a schematic top view of a die connected to a plurality of other dies through a communication interface according to an embodiment of the disclosure.

FIG. 2 is a schematic top view of a die connected to a plurality of other dies through a communication interface according to an embodiment of the disclosure. Please refer to FIG. 2, a die 200 (for example, a processor or an ASIC die) can be connected to a plurality of dies 202 through a communication interface 204, so that data can be transmitted between the die 200 and the die 202. The communication interface 204 may include wiring and contact elements in the contact element pattern so that the die 200 can be connected to the die 202.

Figure 3:
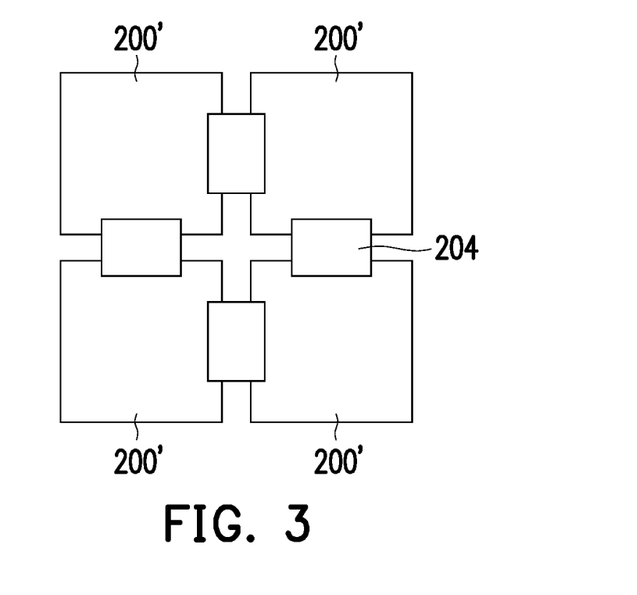
FIG. 3 is a schematic top view of a plurality of dies connected to each other through a communication interface according to another embodiment of the disclosure.

FIG. 3 is a schematic top view of a plurality of dies connected to each other through a communication interface according to another embodiment of the disclosure. Please refer to FIG. 3, a plurality of processor dies 200' can be connected together to form a large-scale processor with functions that are more powerful. Under the circumstances, these processor dies 200' are also connected through the communication interface 204.

As described above, the 2.5D packaging process can be applied to stack various dies side by side without substantially further consuming device area. However, in order to allow the dies to be connected more freely, the contact elements in the communication interface 204 need to be appropriately arranged in a compact manner and further symmetrized for receiving and transmitting signals. The communication between the die 200 to the die 202 can be easily arranged in the peripheral area. Here, the communication interface 204 may also refer to a Glink interface provided in the market.

Figure 4:
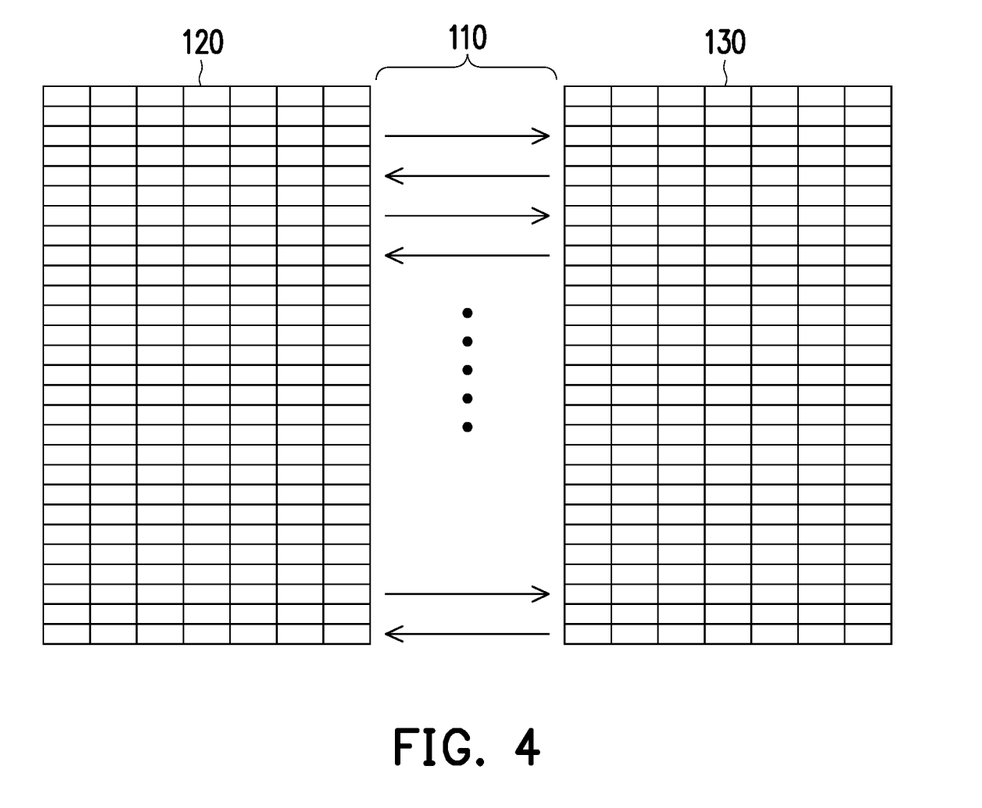
FIG. 4 is a schematic view of communication between two dies based on an interface having an interposer layer or a redistribution layer according to an embodiment of the disclosure.

FIG. 4 is a schematic view of communication between two dies based on an interface having an interposer layer or an RDL layer according to an embodiment of the disclosure. Please refer to FIG. 4, in an example, the ASIC die 130 and the SerDes die 120 communicate through an interposer layer or the RDL layer 110. The contact elements of the ASIC die 130 and the SerDes die 120 that are used for being in contact with the interposer layer or the RDL layer 110 are appropriately arranged. Each contact element can transmit one specific signal simultaneously. Therefore, parallel busbars are established based on contact elements. The signal at each contact element is in a serial format, such as a bit string.

Figure 5:
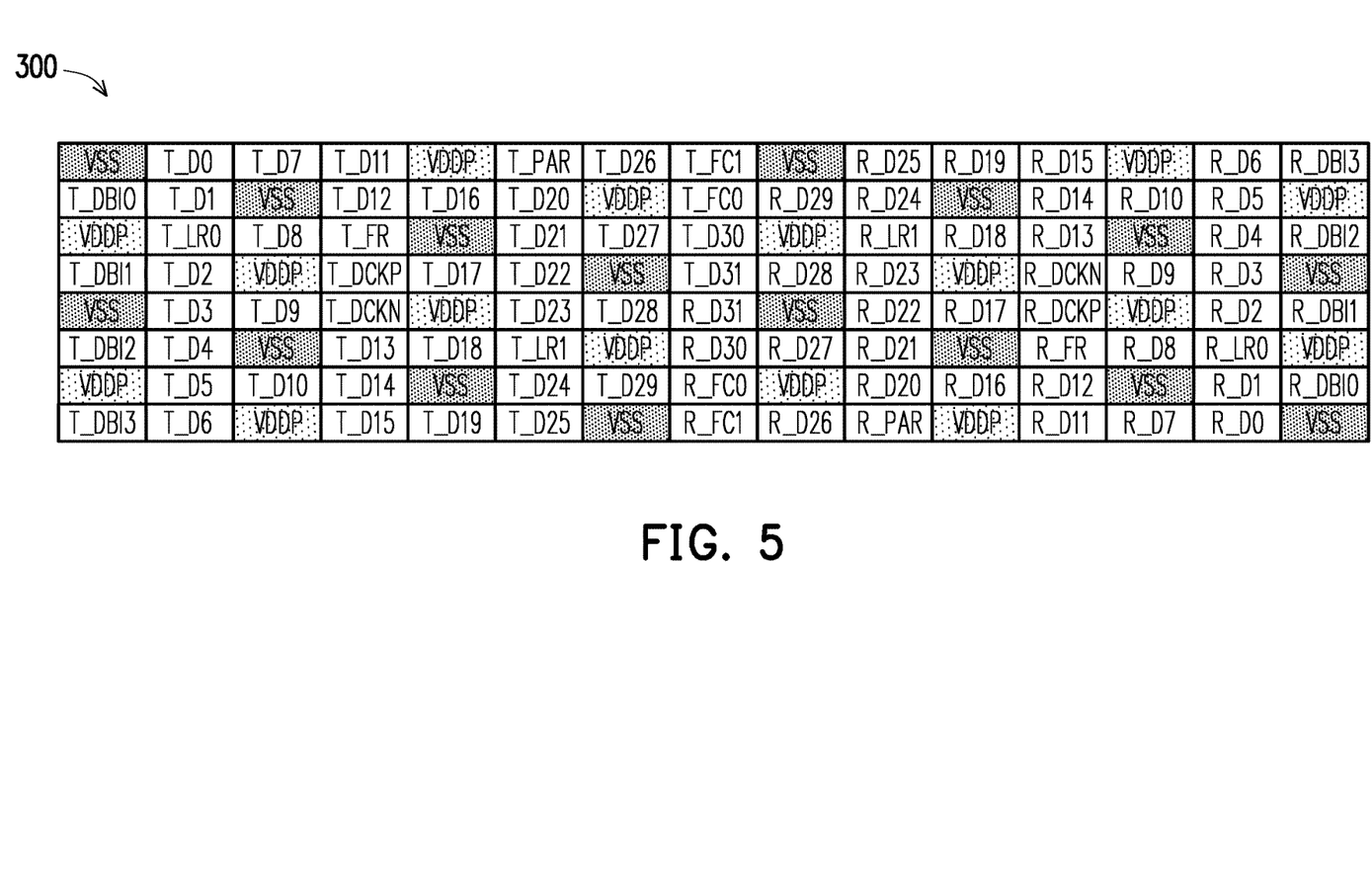
FIG. 5 is a schematic view illustrating the structure of a contact element pattern according to an embodiment of the disclosure.

FIG. 5 is a schematic view illustrating the structure of a contact element pattern according to an embodiment of the disclosure. Please refer to FIG. 5, the total number of contact elements involved in the communication interface can be one number, and the signals are transmitted in parallel in the communication interface. The total number of contact elements involved in the communication interface can be a greater number. The signal is transmitted in parallel between the dies. According to the size of the data in a busbar, the size of the 32-bit data with the operating voltage and other functional signals is set as a slice (refer to the contact element pattern 300). The contact element pattern 300 can be duplicated in a certain number (for example, 8) to adapt to the total data size in the parallel communication. In an embodiment, the data corresponds to 32 bits having a sequence of R_D0 to R_D31 and T_D0 to T_D31. In the sequence, T represents a contact element for transmission and R represents a contact element for reception. In addition, the contact element pattern 300 further includes a plurality of low voltage signals VSS and a plurality of high voltage signals VDDP. Furthermore, various functional signals are further included, including FRAM T/R_FR, clock T/R_DCK_P/N, flow control T/R_FC[1:0], DBI T/R_DBI [3:0], parity T/R_PAR, and lane repair T/R_LR[1:0]. However, the contact element used for the functional signal is not limited to those mentioned in the embodiment.

Table 1 is an example of contact elements defining a transmission (T) group or a receiving (R) group. The transmitting group and the receiving group have the same number of contact elements.

TABLE 1

| Type of contact element | Number | Definition |
| --- | --- | --- |
| Data, T/R [31:0] | 32 | Data bits are synchronized with CLK |
| Frame, T/R_FRAME | 1 | FRAME bit is synchronized with CLK |
| Clock, T/R_DCK_P/N | 2 | CLK differential pair |
| Flow control, T/R_FC[1:0] | 2 | For data busbar that is asynchronous and in different directions |
| DBI, T/R_DBI[3:0] | 4 | One DBI per tuple, used to reverse the content of busbar for better single sign-on (SSO) |
| Parity, T/R_PAR | 1 | One every 32 bits, used to identify error conditions |
| Lane repair, T/R_LR[1:0] | 2 | The lane repair bit is used to repair data, parity, and DBI, but not to repair CLK, FRAME, and FC signals. |

Based on the interposer layer or RDL layer 110 described above, various signals carry out communication between the two dies. However, in an example, a group of parallel signals in communication can be converted into a serial format to be transmitted/received through a wiring with a contact element. Once the data signal in serial format is received by the die, the die will deserialize the data signal into a parallel format.

Figure 6:
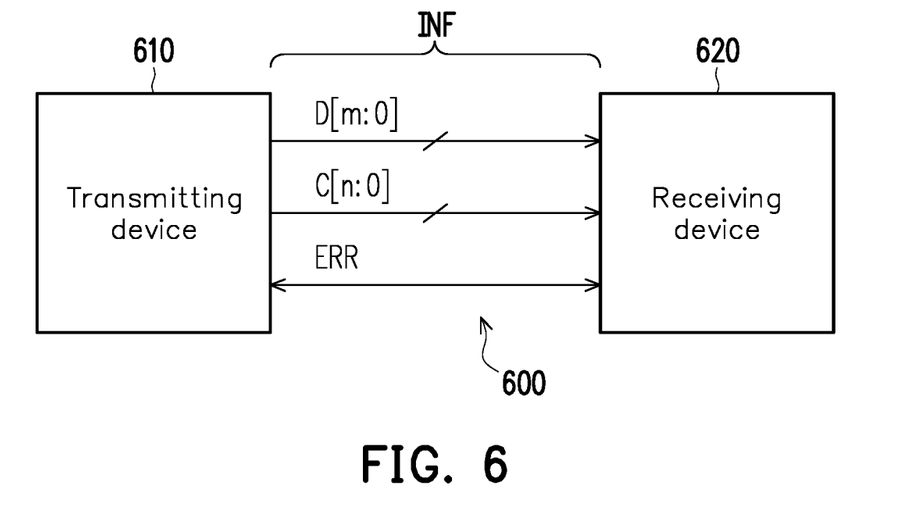
FIG. 6 is a circuit block diagram of a communication system according to an embodiment of the disclosure.

FIG. 6 is a circuit block diagram of a communication system 600 according to an embodiment of the disclosure. The communication system 600 shown in FIG. 6 includes a transmitting device 610 and a receiving device 620. The transmitting device 610 can transmit a data stream to the receiving device 620 through the communication interface INF. The data stream includes a plurality of data units, such as the current data unit D[m:0] shown in FIG. 6. Each data unit is m+1 bits of data, and m is an integer determined according to the actual design.

This embodiment provides no limitation to the product categories of the transmitting device 610 and the receiving device 620. For example, according to actual design, the transmitting device 610 and/or the receiving device 620 may be a die, an integrated circuit, an electronic device, or other devices/elements. In the implementation example in which the transmitting device 610 and the receiving device 620 are two dies, the related description of the SerDes die 120 and/or the ASIC die 130 can serve as one of many implementation examples of the transmitting device 610 and/or the receiving device 620. Alternatively, the transmitting device 610 and/or the receiving device 620 can be inferred by referring to the description related to the die 200, the die 202 and/or the processor die 200', and the communication interface INF can be inferred by referring to the description related to the communication interface 204.

Figure 7:
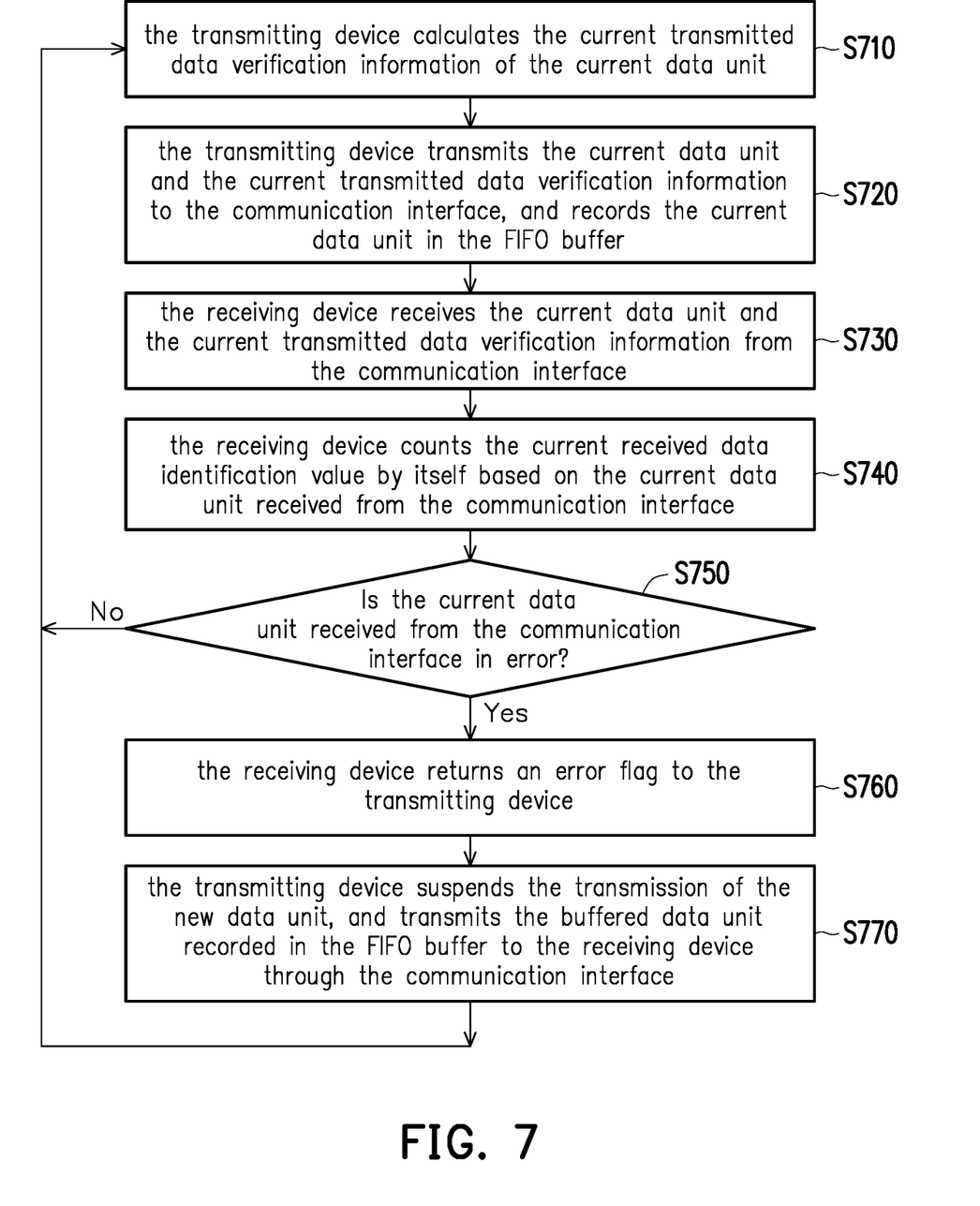
FIG. 7 is a schematic flowchart of an operation method of a communication system according to an embodiment of the disclosure.

FIG. 7 is a schematic flowchart of an operation method of a communication system according to an embodiment of the disclosure. Please refer to FIG. 6 and FIG. 7. In step S710, the transmitting device 610 can calculate the transmitted data verification information C[n:0] of the current data unit D[m:0] in the multiple data units. Specifically, the transmitted data verification information C[n:0] is n+1 bits of data, and n is an integer determined according to the actual design. In step S720, the transmitting device 610 can transmit the current data unit D[m:0] and the transmitted data verification information C[n:0] to the communication interface INF, and record the current data unit D[m:0] in the FIFO buffer (not shown in FIG. 6).

In step S730, the receiving device 620 can receive the current data unit D[m:0] and the transmitted data verification information C[n:0] from the communication interface INF. In step S740, the receiving device 620 can count the received data identification value by itself based on the current data unit D[m:0] received from the communication interface INF. In step S750, the receiving device 620 can use the received data identification value and the transmitted data verification information C[n:0] received from the communication interface INF to check whether the current data unit D[m:0] received from the communication interface INF is in error.

When the current data unit D[m:0] received from the communication interface INF is in error (the determining result of step S750 is "Yes"), the receiving device 620 can proceed to step S760. In step S760, the receiving device 620 can return an error flag ERR to the transmitting device 610. In step S770, the transmitting device 610 can suspend the transmission of the new data unit based on the error flag ERR, and transmit at least one buffered data unit recorded in the FIFO buffer (not shown in FIG. 6) to the receiving device 620 through the communication interface INF.

In some embodiments, after the at least one buffered data unit recorded in the FIFO buffer (not shown in FIG. 6) is transmitted to the communication interface INF, the transmitting device 610 can resume the transmission of the new data unit. In other embodiments, after all the buffered data units recorded in the FIFO buffer (not shown in FIG. 6) are transmitted to the receiving device 620 through the communication interface INF, the transmitting device 610 can resume the transmission of the new data unit. For some actual application scenarios, assuming that the transmitting device 610 receives the error flag ERR again during the period when all the buffered data units recorded in the FIFO buffer (not shown in FIG. 6) are transmitted to the receiving device 620, the transmitting device 610 can once again transmit all the buffered data units recorded in the FIFO buffer (not shown in FIG. 6) to the receiving device 620 through the communication interface INF.

According to actual design, in some embodiments, the transmitting device 610 can further count the current transmitted data identification value by itself based on the current data unit D[m:0]. The transmitting device 610 can use the current transmitted data identification value to calculate the transmitted data verification information C[n:0] of the current data unit D[m:0], and record the current transmitted data identification value in the FIFO buffer (not shown in FIG. 6). The number of bits of the current transmitted data identification value of the transmitting device 610 (that is, the counting cycle of the current transmitted data identification value) can be determined according to actual design, and the number of bits of the received data identification value of the receiving device 620 (that is, the counting cycle of the received data identification value) can also be determined according to actual design. For example, in some embodiments, the transmitting device 610 may use a first counter to generate the current transmitted data identification value, and the receiving device 620 may use a second counter to generate the received data identification value. The counting cycle of any one of the first counter and the second counter is equal to or greater than the depth of the FIFO buffer.

During the initialization period before multiple data units (current data unit D[m:0]) are transmitted (that is, before the normal transmission period starts), the transmitting device 610 can transmit a synchronization signal to the receiving device 620 so that the received data identification value of the receiving device 620 can be synchronized with the current transmitted data identification value of the transmitting device 610. During the normal transmission period, the current transmitted data identification value of the transmitting device 610 is not transmitted to the receiving device 620, so as to save the transmission bandwidth between the transmitting device 610 and the receiving device 620.

In some embodiments, when the receiving device 620 returns the error flag ERR to the transmitting device 610, the transmitting device 610 can transmit a synchronization signal to the receiving device 620 based on the error flag ERR, so that the received data identification value of the receiving device 620 can be synchronized with the current transmitted data identification value corresponding to the buffered data unit output by the transmitting device 610. In other embodiments, once the receiving device 620 detects that the current data unit D[m:0] is in error, the receiving device 620 can return the received data identification value corresponding to the current data unit D[m:0] to the transmitting device 610 through a return channel. Then, the FIFO buffer (not shown in FIG. 6) of the transmitting device 610 transmits the buffered data unit to the receiving device 620 starting from a buffered data unit corresponding to the received data identification value.

Figure 8:
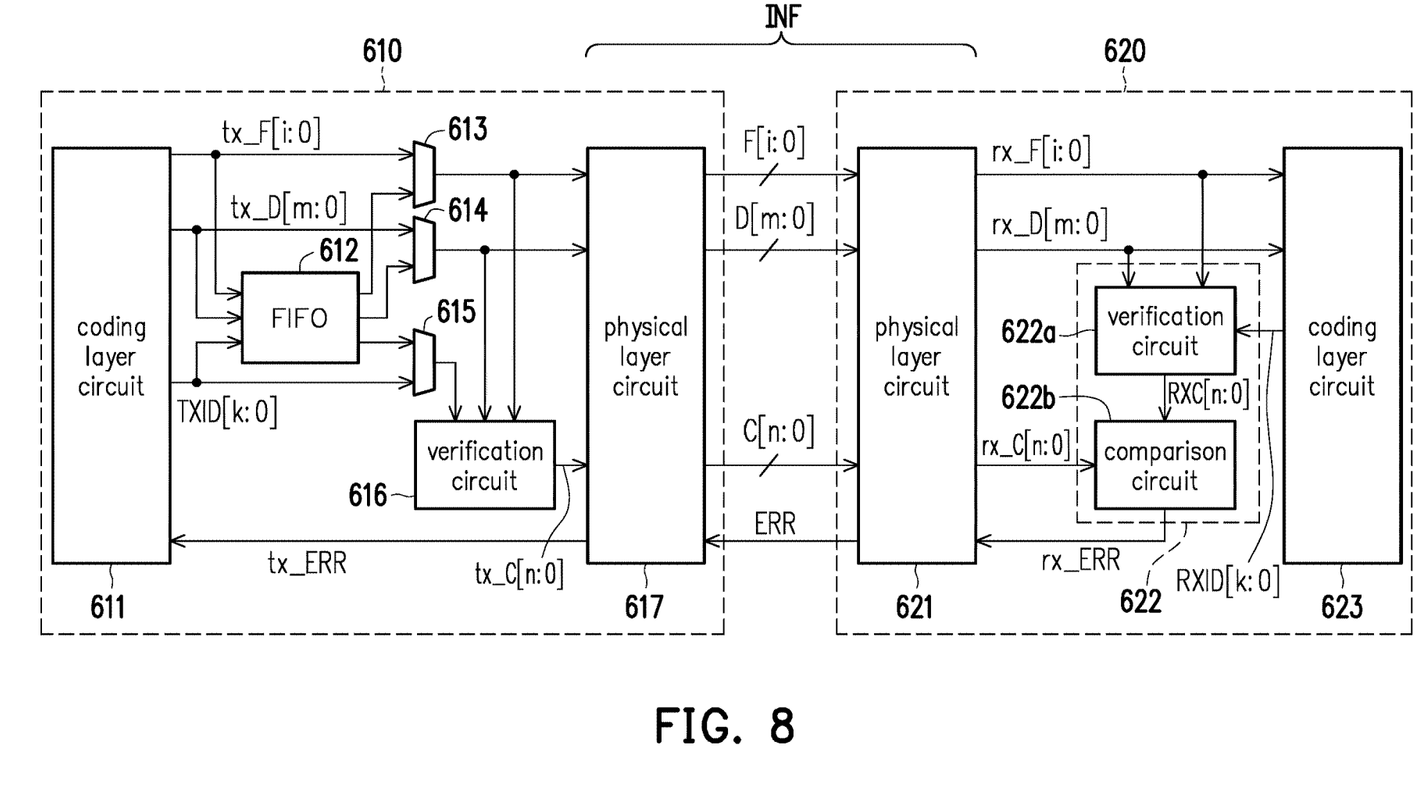
FIG. 8 is a circuit block diagram illustrating the transmitting device and the receiving device shown in FIG. 6 according to an embodiment of the disclosure.

FIG. 8 is a circuit block diagram illustrating the transmitting device 610 and the receiving device 620 shown in FIG. 6 according to an embodiment of the disclosure. In the embodiment shown in FIG. 8, the transmitting device 610 includes a coding layer circuit 611, an FIFO buffer 612, a switching circuit 613, a switching circuit 614, a switching circuit 615, a verification circuit 616, and a physical layer circuit 617, and the receiving device 620 includes a physical layer circuit 621, an inspection circuit 622, and a coding layer circuit 623. The physical layer circuit 617, the physical layer circuit 621, and the routing structure between the physical layer circuit 617 and the physical layer circuit 621 may be regarded as the communication interface INF.

According to actual design, in some embodiments, the coding layer circuit 611 may include a physical coding sublayer (PCS) circuit and/or other coding layers. The coding layer circuit 611 can generate a data stream (multiple data units, including the current data unit tx_D[m:0]), and count the current transmitted data identification value TXID[k:0] by itself based on the current data unit tx_D[m:0]. Specifically, the current transmitted data identification value TXID[k:0] is data of k+1 bits, and k is an integer determined according to the actual design. For example (but not limited thereto), m can be 511 or other integers, and k can be 4 or other integers. In some embodiments, the coding layer circuit 611 may use the counter to generate the current transmitted data identification value TXID[k:0]. For example, when the coding layer circuit 611 generates the first data unit, the current transmitted data identification value TXID[k:0] is "1", and when the coding layer circuit 611 generates the second data unit, the current transmitted data identification value TXID[k:0] is progressed to "2", and the rest can be deduced by analogy. Therefore, the current transmitted data identification value TXID[k:0] can serve as the index (or identification code) of the current data unit tx_D[m:0]. The counting cycle of the counter of the coding layer circuit 611 is equal to or greater than the depth of the FIFO buffer 612.

In addition, the coding layer circuit 611 can generate frame information tx_F[i:0]. Specifically, the frame information tx_F[i:0] is i+1 bits of data, and i is an integer determined according to the actual design. For example (but not limited thereto), i can be 7 or other integers. Each bit of the frame information tx_F[i:0] can indicate the validity of a corresponding character in the current data unit tx_D[m:0]. When the frame information tx_F[i:0] indicates that a certain character (or some characters) in the current data unit tx_D[m:0] is invalid, the transmitting device 610 will not transmit this (or these) invalid characters to the communication interface INF so as to save transmission bandwidth.

The FIFO buffer 612 is coupled to the coding layer circuit 611 to receive and record the frame information tx_F[i:0], the current data unit tx_D[m:0], and the current transmitted data identification value TXID[k:0]. The first input terminal of the switching circuit 613 is coupled to the coding layer circuit 611 to receive the frame information tx_F[i:0]. The second input terminal of the switching circuit 613 is coupled to the frame information output terminal of the FIFO buffer 612. The output terminal of the switching circuit 613 is coupled to the physical layer circuit 617 (communication interface INF). According to actual design, in some embodiments, the physical layer circuit 617 may include a physical medium attachment (PMA) circuit and/or other physical layers. Based on the frame information output by the switching circuit 613, the physical layer circuit 617 can transmit the frame information F[i:0] to the physical layer circuit 621 of the receiving device 620 through the routing structure.

The first input terminal of the switching circuit 614 is coupled to the coding layer circuit 611 to receive the current data unit tx_D[m:0]. The second input terminal of the switching circuit 614 is coupled to the data output terminal of the FIFO buffer 612. The output terminal of the switching circuit 614 is coupled to the physical layer circuit 617 (communication interface INF). Based on the data unit output by the switching circuit 614, the physical layer circuit 617 can transmit the current data unit D[m:0] to the physical layer circuit 621 of the receiving device 620 through the routing structure. The first input terminal of the switching circuit 615 is coupled to the coding layer circuit 611 to receive the current transmitted data identification value TXID[k:0]. The second input terminal of the switching circuit 615 is coupled to the identification value output terminal of the FIFO buffer 612.

During the normal transmission period, the switching circuit 613 chooses to transmit the frame information tx_F[i:0] to the physical layer circuit 617 and the verification circuit 616, the switching circuit 614 chooses to transmit the current data unit tx_D[m:0] to the physical layer circuit 617 and the verification circuit 616, and the switching circuit 615 chooses to transmit the current transmitted data identification value TXID[k:0] to the verification circuit 616. The verification circuit 616 is coupled to the output terminal of the switching circuit 613, the output terminal of the switching circuit 614, and the output terminal of the switching circuit 615. The verification circuit 616 may use the frame information output by the switching circuit 613, the data unit output by the switching circuit 614, and the identification value output by the switching circuit 615 to calculate the transmitted data verification information tx_C[n:0]. According to actual design, in some embodiments, the verification circuit 616 may include a cyclic redundancy check (CRC) circuit, a parity check circuit, or other verification/inspection calculation circuits. The verification circuit 616 can output the transmitted data verification information tx_C[n:0] to the physical layer circuit 617 (communication interface INF). Based on the transmitted data verification information tx_C[n:0], the physical layer circuit 617 can transmit the transmitted data verification information C[n:0] to the physical layer circuit 621 of the receiving device 620 through the routing structure. Therefore, the verification circuit 616 can transmit the transmitted data verification information tx_C[n:0] to the receiving device 620 through the communication interface INF.

The physical layer circuit 621 can receive frame information F[i:0], current data unit D[m:0], and transmitted data verification information C[n:0] from the communication interface INF. According to actual design, in some embodiments, the physical layer circuit 621 may include a PMA circuit and/or other physical layers. Based on the frame information F[i:0], the physical layer circuit 621 can transmit the frame information rx_F[i:0] to the coding layer circuit 623 and the inspection circuit 622. Based on the current data unit D[m:0], the physical layer circuit 621 can transmit the current data unit rx_D[m:0] to the coding layer circuit 623 and the inspection circuit 622. Based on the transmitted data verification information C[n:0], the physical layer circuit 621 can transmit the transmitted data verification information rx_C[n:0] to the inspection circuit 622.

The coding layer circuit 623 is coupled to the physical layer circuit 621 to receive the frame information rx_F[i:0] and the current data unit rx_D[m:0]. According to actual design, in some embodiments, the coding layer circuit 623 may include a PCS circuit and/or other coding layers. The coding layer circuit 623 can count the received data identification value RXID[k:0] by itself based on the current data unit rx_D[m:0] received from the physical layer circuit 621 (communication interface INF). Specifically, the received data identification value RXID[k:0] is data of k+1 bits, and k is an integer determined according to the actual design. In some embodiments, the coding layer circuit 623 can use a counter to generate the received data identification value RXID[k:0]. For example, when the coding layer circuit 623 receives the first data unit, the received data identification value RXID[k:0] is "1", and when the coding layer circuit 623 receives the second data unit, the received data identification value RXID[k:0] is progressed to "2", and the rest can be inferred by analogy. Therefore, the received data identification value RXID[k:0] can be used as the index (or identification code) of the current data unit rx_D[m:0]. Specifically, the counting cycle of the counter of the coding layer circuit 623 is equal to or greater than the depth of the FIFO buffer 612.

During the initialization period before multiple data units (current data unit D[m:0]) are transmitted (that is, before the normal transmission period starts), the coding layer circuit 611 of the transmitting device 610 can transmit a synchronization signal to the coding layer circuit 623 of the receiving device 620 through the frame information F[i:0], so that the received data identification value RXID[k:0] of the receiving device 620 can be synchronized with the current transmitted data identification value TXID[k:0] of the transmitting device 610. During normal transmission period, the current transmitted data identification value TXID[k:0] of the transmitting device 610 is not transmitted to the receiving device 620, so as to save the transmission bandwidth between the transmitting device 610 and the receiving device 620.

The inspection circuit 622 is coupled to the physical layer circuit 621 to receive the frame information rx_F[i:0], the current data unit rx_D[m:0] and the transmitted data verification information rx_C[n:0]. The inspection circuit 622 is coupled to the coding layer circuit 623 to receive the received data identification value RXID[k:0]. The inspection circuit 622 can use the received data identification value RXID[k:0] and the transmitted data verification information rx_C[n:0] to check whether the current data unit rx_D[m:0] is in error. When the current data unit rx_D[m:0] is in error, the inspection circuit 622 can generate an error flag rx_ERR to the physical layer circuit 621.

In the embodiment shown in FIG. 8, the inspection circuit 622 includes a verification circuit 622a and a comparison circuit 622b. The verification circuit 622a is coupled to the physical layer circuit 621 to receive the frame information rx_F[i:0] and the current data unit rx_D[m:0]. The verification circuit 622a is coupled to the coding layer circuit 623 to receive the received data identification value RXID[k:0]. The verification circuit 622a may use the frame information rx_F[i:0], the current data unit rx_D[m:0] and the received data identification value RXID[k:0] to calculate the current received data verification information RXC[n:0].

The comparison circuit 622b is coupled to the physical layer circuit 621 to receive the transmitted data verification information rx_C[n:0]. The comparison circuit 622b is coupled to the verification circuit 622a to receive the current received data verification information RXC[n:0]. The comparison circuit 622b can compare the transmitted data verification information rx_C[n:0] with the current received data verification information RXC[n:0]. When the current received data verification information RXC[n:0] does not match the transmitted data verification information rx_C[n:0], the comparison circuit 622b can generate an error flag rx_ERR to the physical layer circuit 621.

Based on the error flag rx_ERR output by the comparison circuit 622b, the physical layer circuit 621 can transmit the error flag ERR to the physical layer circuit 617 of the transmitting device 610 through the routing structure. Based on the error flag ERR from the receiving device 620, the physical layer circuit 617 may transmit the error flag tx_ERR to the coding layer circuit 611. When the receiving device 620 returns the error flag ERR to the transmitting device 610, the transmitting device 610 can transmit a synchronization signal to the receiving device 620 through the frame information F[i:0], so that the received data identification value RXID[k:0] of the receiving device 620 can be synchronized with the current transmission data identification value corresponding to the buffered data unit output by the FIFO buffer 612 of the transmitting device 610.

When the transmitting device 610 receives the error flag ERR, the coding layer circuit 611 can suspend the output of the new data unit tx_D[m:0], and the output terminal of the switching circuit 613 is coupled to the second input terminal of the switching circuit 613, the output terminal of the switching circuit 614 is coupled to the second input terminal of the switching circuit 614, and the output terminal of the switching circuit 615 is coupled to the second input terminal of the switching circuit 615. That is, the switching circuit 613 chooses to couple the frame information output terminal of the FIFO buffer 612 to the physical layer circuit 617 and the verification circuit 616, the switching circuit 614 chooses to couple the data output terminal of the FIFO buffer 612 to the physical layer circuit 617 and the verification circuit 616, and the switching circuit 615 chooses to couple the identification value output terminal of the FIFO buffer 612 to the verification circuit 616. Therefore, at least one buffered data unit recorded in the FIFO buffer 612 can be transmitted to the receiving device 620 through the communication interface INF.

The buffered data unit recorded in the FIFO buffer 612 includes the original data unit corresponding to the current data unit rx_D[m:0] where the error has occurred. Therefore, when the receiving device 620 finds that the current data unit rx_D[m:0] is in error, the transmitting device 610 can retrieve the original data unit corresponding to the current data unit rx_D[m:0] from the FIFO buffer 612, and the original data unit is transmitted to the receiving device 620 again. Therefore, once the receiving device 620 detects an error, the receiving device 620 can identify the data identification value of the damaged data unit, and then the receiving device 620 can wait for the data unit with the same data identification value to be retransmitted from the FIFO buffer 612. Once the correct data unit with the same data identification value is found, the coding layer circuit 623 can send the correct data unit to the user interface (application layer).

After all the buffered data units recorded in the FIFO buffer 612 are transmitted to the receiving device 620 through the communication interface INF, the output terminal of the switching circuit 613 is coupled to the first input terminal of the switching circuit 613, the output terminal of the switching circuit 614 is coupled to the first input terminal of the switching circuit 614, the output terminal of the switching circuit 615 is coupled to the first input terminal of the switching circuit 615, and the coding layer circuit 611 restores the output of the new data unit tx_D[m:0]. That is, when the transmitting device 610 restores to the normal transmission period, the switching circuit 613 chooses to transmit the frame information tx_F[i:0] to the physical layer circuit 617 and the verification circuit 616, the switching circuit 614 chooses to transmit the current data unit tx_D[m:0] to the physical layer circuit 617 and the verification circuit 616, and the switching circuit 615 chooses to transmit the current transmitted data identification value TXID[k:0] to the verification circuit 616.

For some actual application scenarios, assuming that during the period when all of the buffered data units recorded in the FIFO buffer 612 are transmitted to the receiving device 620, the transmitting device 610 receives the error flag ERR again, then the transmitting device 610 can once again transmit all the buffered data units recorded in the FIFO buffer 612 to the receiving device 620 through the communication interface INF. Therefore, when the receiving device 620 finds that the current data unit rx_D[m:0] is in error, the transmitting device 610 can transmit the original data unit corresponding to the current data unit rx_D[m:0] to the receiving device 620 again, until the current data unit rx_D[m:0] is correct.

In other embodiments, once the receiving device 620 detects that the current data unit rx_D[m:0] is in error, the receiving device 620 can return the received data identification value RXID[k:0] corresponding to the current data unit rx_D[m:0] to the transmitting device 610 through the return channel. Then, the FIFO buffer 612 of the transmitting device 610 transmits the buffered data unit to the receiving device 620 starting from a buffered data unit corresponding to the received data identification value RXID[k:0].

In summary, the receiving device 620 described in the foregoing embodiments can count the received data identification value RXID[k:0] by itself. Therefore, during normal transmission period, there is no need to transmit the identification value of the current data unit D[m:0] between the receiving device 620 and the transmitting device 610. When the current data unit rx_D[m:0] received by the receiving device 620 is in error, the receiving device 620 can return an error flag ERR to the transmitting device 610, so as to notify the transmitting device 610 to transmit the buffered data unit recorded in the FIFO buffer 612 to the receiving device 620 again.

Although the disclosure has been disclosed in the above embodiments, it is not intended to limit the disclosure. Anyone with ordinary knowledge in the relevant technical field can make some changes and modification without departing from the spirit and scope of the disclosure. Therefore, the scope to be protected by the disclosure shall be subject to the appended claims.

What is claimed is:

1. A communication system, comprising:
   a transmitting device configured to calculate transmitted data verification information of a current data unit in a plurality of data units, transmit the current data unit and the transmitted data verification information to a communication interface, and record the current data unit in an FIFO (first-in-first-out) buffer; and
   a receiving device configured to receive the current data unit and the transmitted data verification information from the communication interface, calculate a received data identification value by itself based on the current data unit received from the communication interface, and use the received data identification value and the transmitted data verification information received from the communication interface to check whether the current data unit received from the communication interface is in error, wherein
   the receiving device returns an error flag to the transmitting device when the current data unit received from the communication interface is in error;
   the transmitting device suspends transmission of a new data unit based on the error flag, and transmits at least one buffered data unit recorded in the FIFO buffer to the receiving device through the communication interface,
   the received data identification value is an identification code of the current data unit; and
   the transmitting device calculates a current transmitted data identification value by itself based on the current data unit, uses the current transmitted data identification value to calculate the transmitted data verification information of the current data unit, and records the current transmitted data identification value in the FIFO buffer.

2. The communication system according to claim 1, wherein after all of the buffered data units recorded in the FIFO buffer are transmitted to the receiving device through the communication interface, the transmitting device resumes the transmission of the new data unit.

3. The communication system according to claim 1, wherein when the transmitting device receives the error flag again during a period when all of the buffered data units recorded in the FIFO buffer are transmitted to the receiving device, all of the buffered data units recorded in the FIFO buffer are transmitted to the receiving device through the communication interface again.

4. The communication system according to claim 1, wherein the transmitting device uses a first counter to generate the current transmitted data identification value, the receiving device uses a second counter to generate the received data identification value, and a counting cycle of any one of the first counter and the second counter is equal to or greater than a depth of the FIFO buffer.

5. The communication system according to claim 1, wherein the current transmitted data identification value is not transmitted to the receiving device, and during an initialization period before the plurality of data units are transmitted, the transmitting device transmits a synchronization signal to the receiving device, so that the received data identification value of the receiving device is synchronized with the current transmitted data identification value of the transmitting device.

6. The communication system according to claim 1, wherein the transmitting device transmits a synchronization signal to the receiving device based on the error flag, so that the received data identification value of the receiving device is synchronized with the current transmitted data identification value corresponding to the buffered data unit.

7. The communication system according to claim 1, wherein once the receiving device detects that the current data unit is in error, the receiving device returns the received data identification value corresponding to the current data unit to the transmitting device through a return channel, and the FIFO buffer of the transmitting device transmits at least one buffered data unit to the receiving device starting from the one buffered data unit corresponding to the received data identification value.

8. The communication system according to claim 1, wherein the transmitting device comprises:
   a coding layer circuit configured for generating the plurality of data units and counting the current transmitted data identification value by itself based on the current data unit;
   the FIFO buffer coupled to the coding layer circuit to receive and record the current data unit and the current transmitted data identification value;
   a first switching circuit having a first input terminal coupled to the coding layer circuit to receive the current data unit, wherein a second input terminal of the first switching circuit is coupled to a data output terminal of the FIFO buffer, and an output terminal of the first switching circuit is coupled to the communication interface;
   a second switching circuit having a first input terminal coupled to the coding layer circuit to receive the current transmitted data identification value, wherein a second input terminal of the second switching circuit is coupled to an identification value output terminal of the FIFO buffer; and
   a verification circuit coupled to the output terminal of the first switching circuit, and coupled to an output terminal of the second switching circuit, wherein the verification circuit uses an identification value output by the second switching circuit and a data unit output by the first switching circuit to calculate the transmitted data verification information, and the verification circuit transmits the transmitted data verification information to the receiving device through the communication interface.

9. The communication system according to claim 8, wherein
   when the transmitting device receives the error flag, the coding layer circuit suspends output of a new data unit, the output terminal of the first switching circuit is coupled to the second input terminal of the first switching circuit, and the output terminal of the second switching circuit is coupled to the second input terminal of the second switching circuit; and
   after all of the buffered data units recorded in the FIFO buffer are transmitted to the receiving device through the communication interface, the output terminal of the first switching circuit is coupled to the first input terminal of the first switching circuit, the output terminal of the second switching circuit is coupled to the first input terminal of the second switching circuit, and the coding layer circuit restores the output of the new data unit.

10. The communication system according to claim 8, wherein the verification circuit comprises a cyclic redundancy check circuit or a parity check circuit.

11. The communication system according to claim 1, wherein the receiving device comprises:
   a physical layer circuit configured for receiving the current data unit and the transmitted data verification information from the communication interface;
   a coding layer circuit coupled to the physical layer circuit to receive the current data unit, wherein the coding layer circuit counts the received data identification value by itself based on the current data unit received from the physical layer circuit; and
   an inspection circuit coupled to the physical layer circuit to receive the current data unit and the transmitted data verification information, and coupled to the coding layer circuit to receive the received data identification value, wherein the inspection circuit uses the received data identification value and the transmitted data verification information to check whether the current data unit is in error, and when the current data unit is in error, the inspection circuit generates the error flag to the physical layer circuit.

12. The communication system according to claim 11, wherein the inspection circuit comprises:
   a verification circuit coupled to the physical layer circuit to receive the current data unit, and coupled to the coding layer circuit to receive the received data identification value, wherein the verification circuit uses the current data unit and the received data identification value to calculate current received data verification information; and
   a comparison circuit coupled to the physical layer circuit to receive the transmitted data verification information, and coupled to the verification circuit to receive the current received data verification information, wherein the comparison circuit compares the transmitted data verification information with the current received data verification information, and when the current received data verification information does not match the transmitted data verification information, the comparison circuit generates the error flag to the physical layer circuit.

13. An operation method of a communication system, comprising:
   calculating, by a transmitting device, transmitted data verification information of a current data unit in a plurality of data units;
   transmitting, by the transmitting device, the current data unit and the transmitted data verification information to a communication interface, and recording the current data unit in an FIFO buffer;
   receiving, by a receiving device, the current data unit and the transmitted data verification information from the communication interface;

calculating, by the receiving device, a received data identification value by itself based on the current data unit received from the communication interface;

using, by the receiving device, the transmitted data verification information received from the communication interface and the received data identification value to check whether the current data unit received from the communication interface is in error;

returning, by the receiving device, an error flag to the transmitting device when the current data unit received from the communication interface is in error;

suspending, by the transmitting device, transmission of a new data unit based on the error flag, and transmitting at least one buffered data unit recorded in the FIFO buffer to the receiving device through the communication interface, calculating, by the transmitting device itself, a current transmitted data identification value based on the current data unit;

using, by the transmitting device, the current transmitted data identification value to calculate the transmitted data verification information of the current data unit; and recording, by the transmitting device, the current transmitted data identification value in the FIFO buffer, wherein the received data identification value is an identification code of the current data unit.

14. The operation method according to claim 13, further comprising:

after all of the buffered data units recorded in the FIFO buffer are transmitted to the receiving device through the communication interface, the transmitting device resumes the transmission of the new data unit.

15. The operation method according to claim 13, further comprising:

when the transmitting device receives the error flag again during a period when all of the buffered data units recorded in the FIFO buffer are transmitted to the receiving device, all of the buffered data units recorded in the FIFO buffer are transmitted to the receiving device through the communication interface again.

16. The operation method according to claim 13, further comprising:

using, by the transmitting device, a first counter to generate the current transmitted data identification value; and using, by the receiving device, a second counter to generate the received data identification value;

wherein a counting cycle of any one of the first counter and the second counter is equal to or greater than a depth of the FIFO buffer.

17. The operation method according to claim 13, wherein the current transmitted data identification value is not transmitted to the receiving device, and the operation method further comprises:

during an initialization period before the plurality of data units are transmitted, the transmitting device transmits a synchronization signal to the receiving device, so that the received data identification value of the receiving device is synchronized with the current transmitted data identification value of the transmitting device.

18. The operation method according to claim 13, further comprising:

transmitting, by the transmitting device, a synchronization signal to the receiving device based on the error flag, so that the received data identification value of the receiving device is synchronized with the current transmitted data identification value corresponding to the buffered data unit.

19. The operation method according to claim 13, further comprising:

once the receiving device detects that the current data unit is in error, the receiving device returns the received data identification value corresponding to the current data unit to the transmitting device through a return channel; and the FIFO buffer of the transmitting device transmits at least one buffered data unit to the receiving device starting from the one buffered data unit corresponding to the received data identification value.

\* \* \* \* \*